Jan. 17, 1950 J. ANTHES 2,494,533

REMOTE RADIO CONTROLLED MOTOR SYSTEM

Filed Aug. 25, 1945 2 Sheets-Sheet 1

Inventor

Jacob Anthes

By Harry M. Saragovitz

ATTORNEY

Jan. 17, 1950 J. ANTHES 2,494,533

REMOTE RADIO CONTROLLED MOTOR SYSTEM

Filed Aug. 25, 1945 2 Sheets-Sheet 2

Inventor

Jacob Anthes

By Harry M. Saragovitz

ATTORNEY

Patented Jan. 17, 1950 2,494,533

UNITED STATES PATENT OFFICE 2,494,533

REMOTE RADIO CONTROLLED MOTOR SYSTEM

Jacob Anthes, United States Army, Milwaukee, Wis.

Application August 25, 1945, Serial No. 612,696

9 Claims. (Cl. 250—2)

(Granted under the act of March 3, 1883, as amended April 30, 1928; 370 O. G. 757)

The invention described herein may be manufactured and used by or for the Government for governmental purposes, without the payment of any royalty thereon.

This invention relates to remote control systems and more particularly to devices for reproducing motion at a distant receiving station in accordance with motion at the transmitting station. The main object of the invention is to provide means for reproducing motion at a remote location.

Other objects include the provision of means for performing the above object by radio and with less equipment than has heretofore been required to transmit controllable motion by radio.

Another object is to perform the function of reproducing motion at a remote location with greater accuracy than has heretofore been possible, and still another object includes the provision of means for reproducing motion at a remote location without interference (such as static) having serious effect.

The invention is carried out by transmitting a signal, the frequency of which is changed in accordance with the motion to be transmitted. When the motion to be transmitted is clockwise, the signal transmitted is a continuous wave signal, but when it is counter-clockwise the transmitted signal is modulated. At the receiving station the signal is detected and caused to beat with another signal. When the received motion is in exact angular relation with fixed reference as the angular position at the transmitting station is to its fixed reference, there is a zero beat, but when the angular position at the receiving station changes with respect to angular position at the transmitting station, a beat note exists which is amplified and caused to energize a relay which in turn energizes a motor which rotates the device at the receiving end so as to follow the corresponding angular changes at the transmitting station. In order that the direction of motion at the receiving station may be caused to accord with the direction of motion at the transmitting station there is provided at the transmitting station an audio modulation. When the direction of motion at the transmitting station is counter-clockwise the audio oscillator is energized and modulates the transmitter, which in turn modulates the radio frequency waves at the receiving station. The modulation is detected at the receiver and operates a relay which in turn operates a motor at the receiving station to control the motion of the device at the receiving end. The direction of movement of the device at the receiving end depends upon whether the transmitted waves are modulated or unmodulated.

Figure 1:
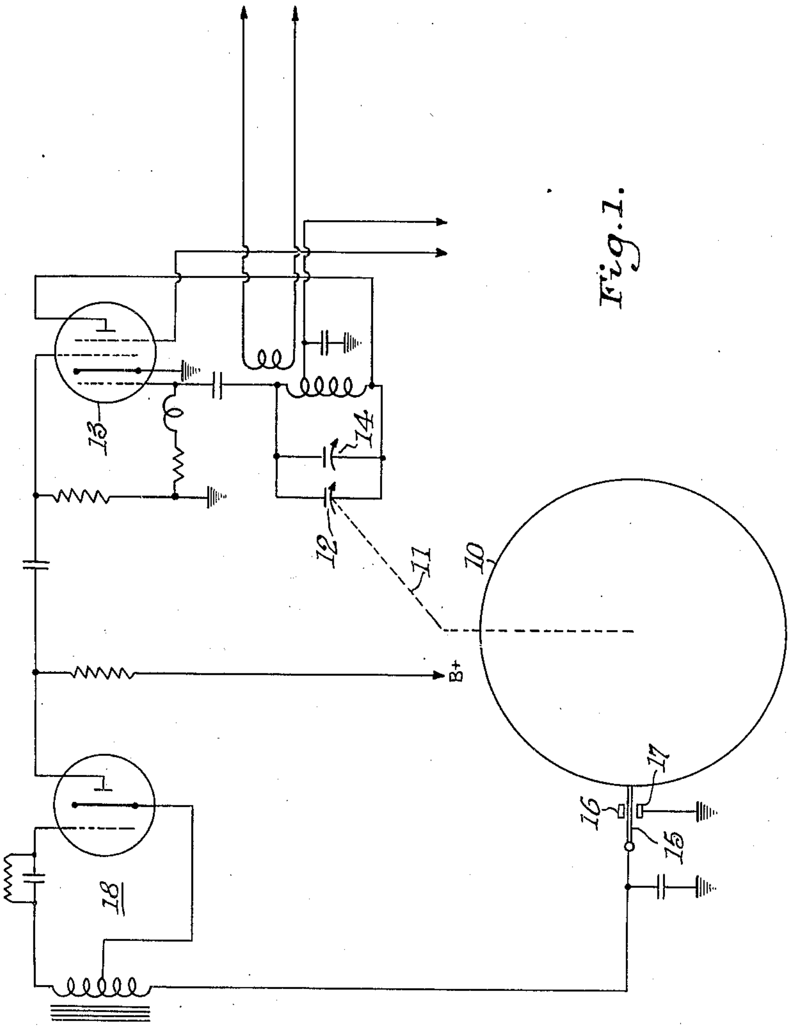
Figure 1 is a schematic diagram of the transmitter which constitutes part of my invention.

Referring particularly to Figure 1 and the transmitting system built according to my invention there is a manually or automatically operated control dial 10 which is moved in accordance with the motion to be transmitted to the remote receiving station. The variable control device 10 may be suitably calibrated and moved to various positions and when so moved a device at the receiving station will follow the movements at the transmitting station as will be hereinafter described. The control dial 10 operates a condenser coupling shaft 11 which rotates the variable condenser 12 of the oscillator of a radio frequency transmitter 13. The output of the transmitter 13 is fed to an antenna or radio frequency amplifier. Variable condenser 14 is included in the transmitter 13 for the purpose of preliminary frequency adjustments. When the coupling shaft 11 is rotated the frequency of the transmitter 13 is changed, and therefore the outgoing frequency indicates the position of the control dial 10.

Cooperating with the dial 10 is a direction determining switch 15 which is a single pole double throw switch and is very sensitive to changes in direction of the dial 10. When the dial 10 is rotated clockwise the switch blade 15 is moved upward to engage the vacant contact point 16. When the dial 10 is rotated counter-clockwise the blade 15 is moved downward to the contact point 17 where it closes the circuit from ground to the audio oscillator 18. When the audio oscillator 18 is connected to ground it becomes energized and modulates the transmitter 13 and produces a modulated wave output. When the control dial 10 is moved clockwise so that the blade 15 is in contact with the point 16 the audio oscillator 18 is not energized and does not modulate the carrier wave of transmitter 13. Hence, whether the carrier wave of transmitter 13 is modulated or not depends on the direction of rotation of control dial 10.

Figure 2:
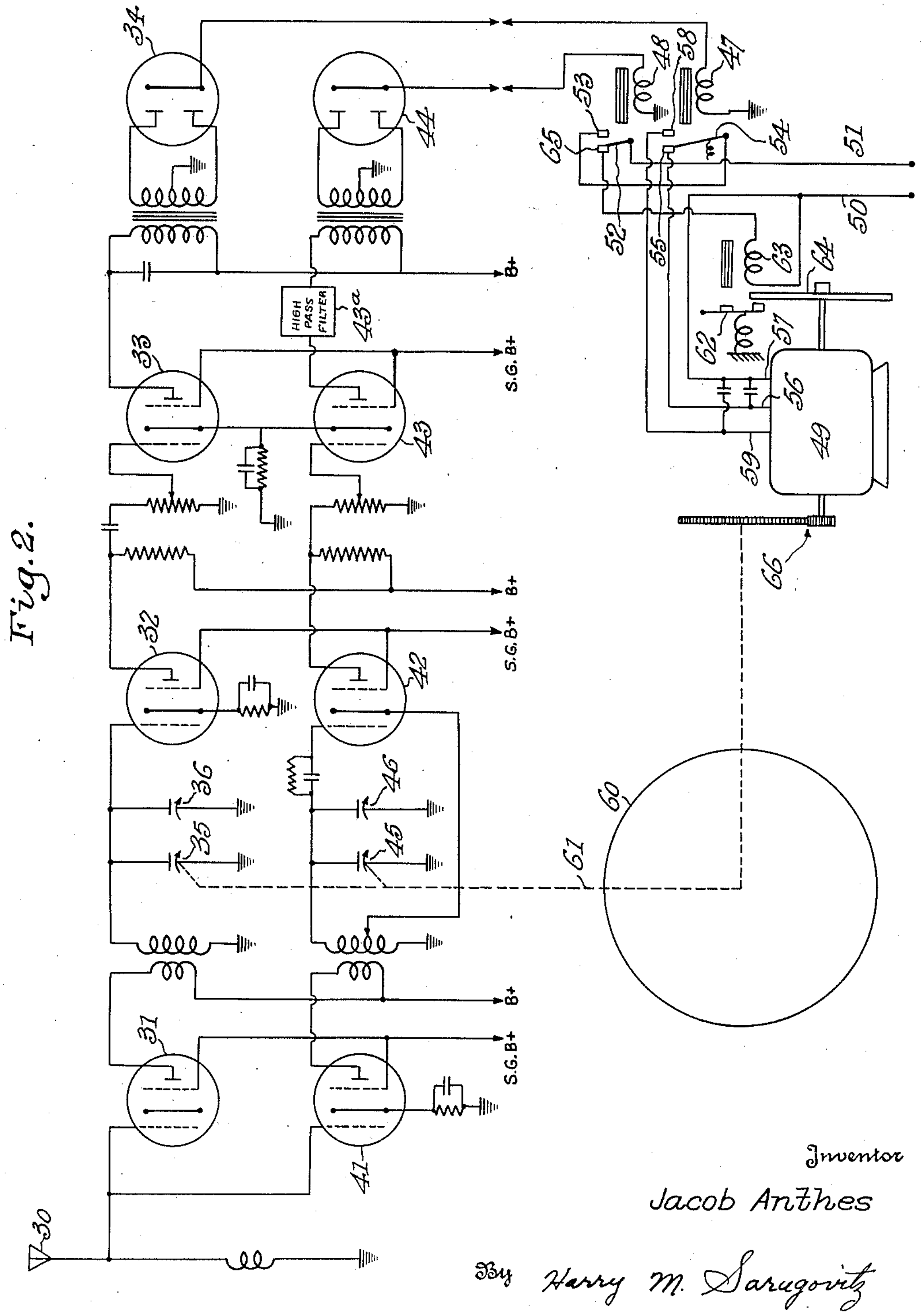
Figure 2 is a schematic diagram of the receiving equipment which constitutes a part of my invention.

Referring to Figure 2 an antenna 30 receives the modulated or unmodulated waves from the transmitter and feeds these waves into first and second receivers. The first receiver includes the radio frequency amplifier 31, the non-oscillating detector 32, the power audio amplifier 33 and the rectifying system 34. The second receiver includes the untuned radio frequency amplifier 41, the oscillating detector 42, the power audio amplifier 43 and the rectifying system 44. The detector 42 is controlled as to frequency by condenser 45. There are also the condensers 36 and 46 which are included in the circuit for the purpose of preliminary frequency adjustments.

The detector 32 is a non-oscillating detector and therefore, functions as a detector only for modulated signals. When a modulated signal is received in the antenna 30 it is amplified at 31, detected at 32, amplified at 33 and rectified by the rectifying system 34 and applied to the relay coil 47. Hence, the relay 47 will be energized when the carrier transmitted by the transmitter is modulated and the relay 47 will not be energized when the carrier transmitting from the transmitter 13 is unmodulated.

The frequency of audio oscillator 18 is preferably made very low, for example, of the order of 30 or 40 cycles per second. Included in the output of oscillating detector 42 is a high pass filter 43a which is designed to eliminate frequencies near and below that of audio oscillator 18. Thus the side band components of the incoming modulated band will be effectively eliminated when oscillating detector 42 is in resonance with the carrier of the incoming modulated wave, and relay 48 will be de-energized when oscillating detector 42 is adjusted to resonance. In practice, the positioning accuracy of the controlled element 60 is not appreciably diminished by filtering out these low frequency components from oscillating detector 42, since the accuracy is already limited by the well-known "pulling" effect between the oscillating detector and the incoming carrier. When the oscillating detector differs in frequency from the incoming carrier by only a small amount, such as 50 cycles per second or less, the detector tends to lock in with the incoming carrier, and thereby no beat note between the incoming carrier and the oscillating detector exists.

When the incoming wave is unmodulated the action of the receiving circuit is as follows: Non-oscillating detector 32 is inoperative to detect the incoming wave and therefore relay 47 is not energized. The carrier wave of the transmitter 13 is amplified at 41, detected at 42 by the oscillating detector (which has a frequency approximately the same as that of transmitter 13) and therefore a beat note is established when the frequency of the carrier does not conform (within the limits determined by the lock in effect between oscillating detector 42 and the incoming carrier) with the frequency of the oscillating detector 42. The beat note, when it is of sufficiently high frequency, is amplified by amplifier 43, passed by filter 43a, rectified by rectifier system 44 and applied to the relay coil 48. Hence when the frequency of the detector 42 does not conform (as above indicated) with the frequency of the carrier of the radio transmitter the relay coil 48 will be energized but when the frequency of the oscillating detector 42 conforms with the frequency of the transmitter 13 the relay coil 48 will not be energized.

Reversible motor 49 is energized by the source of electricity 50, 51 as follows: when the relay coil 48 is energized and the signal received is of a frequency effectively different than the frequency of the oscillating detector 42, the armature 52 is attracted to the right and engages contact point 53, establishing a circuit from source 51, armature 52, contact point 53, armature 54, contact point 55, lead 56 of motor 49, and to the common lead 57 to the source 50. This will cause the motor to rotate in clockwise direction. When, however, the carrier wave of the transmitter is modulated the relay 47 will also be energized attracting armature 54 to the right thus creating an electric circuit as follows: source 51, armature 52, contact point 53, armature 54, contact point 58 and lead 59 of motor 49, common lead 57 and back to the source 50. This will cause the motor 49 to rotate in a counter-clockwise direction. The motor 49 is coupled to the element to be operated 60. It is also coupled to the condenser shaft 61 which varies the frequency of condensers 35 and 45. It is apparent from the foregoing that if the frequency of the transmitter 13 goes up due to a rotation of the control dial 10 that a beat note will be established in detector 42 causing the motor 49 to rotate to vary the frequency of 42 to approach and eventually conform with the frequency of the transmitter 13. Thus, the receiving system which includes oscillating detector 42 and relay 48 determines whether motor 49 will or will not rotate, while the receiving system which includes non-oscillating detector 32 and relay 47 determines the direction in which the motor will rotate.

To prevent overshooting of the frequency once the device 60 has reached its proper position a brake 62 is employed. This brake is an armature which is attracted by the relay coil 63 when the proper position is reached. The brake 62 when attracted by coil 63 bears against the rotary plate 64 which is coupled to the motor 49. When the transmitter frequency and the receiving frequency conform thereby de-energizing the relay 48, the armature 52 falls back against contact point 65 thereby energizing the coil 63 as follows: source 50, coil 63, contact 65, armature 52, and back to the source 51. The motor 49 may be in the suitable form of reversible motor for example, a direct current motor with oppositely wound field coil respectively energized by wires 56—57 and 59—57. The motor 49 is coupled by the reduction gear train 66 to the shaft 61.

I claim to have invented:

1. In a radio remote control device the combination with a movable element whose position is to be transmitted, of a radio transmitter associated with said element, means for changing the frequency of said transmitter in accordance with changes in the position of said element, means for modulating said transmitter responsive to movement of said element in one direction whereby the modulation of said transmitter indicates the direction of motion of said element, a remote receiving station having two receivers, the first including means for detecting the carrier of said transmitter and the second including means for detecting the modulation of said carrier, a motor, means for changing the frequency of said first receiver in accordance with the direction of and extent of rotation of said motor and including means connected to and responsive to the output of the first receiver for energizing said motor when the frequency of said first receiver means differs from the carrier frequency of said transmitter, means connected to and responsive to the output of the second receiver for changing the direction of rotation of said motor in response to changes in the condition of modulation of said carrier whereby the motor will move in a direction to conform the frequency of the first receiver means to carrier frequency of the transmitter, driven means to be operated, and means coupling said driven means to said motor whereby to operate the driven means in accordance with changes in the position of said movable element.

2. In a radio remote control device the combination with a movable element the position of which is to be transmitted, of a radio transmitter associated with said element, means for changing the frequency of said transmitter in accordance with changes in the position of said element, means for amplitude modulating the signals from said transmitter depending on the direction of motion of said element, a receiving station including a movable element, and means for moving the movable element at the receiving station to a degree depending on the changes in frequency of said transmitter and in a direction depending on whether modulated signals are transmitted by said transmitter.

3. In a radio remote control device the combination with a movable element whose position is to be transmitted, of a radio transmitter associated with said element, means for changing frequency of said transmitter in accordance with changes in position of said element, means for modulating said transmitter in a manner depending on the direction of motion of said element, a remote receiving station including means for producing oscillations, an element at the receiving station movable responsive to a frequency difference between said oscillation means and the transmitted carrier and operable upon movement to change the frequency of said oscillation means, said receiving station also including means for detecting the modulation of said carrier to thereby control the direction of motion of said element.

4. A position transmitting device comprising means the position of which is to be transmitted, a radio transmitter, means operated by said first-named means for varying the frequency of said radio transmitter in a direction and to an extent depending on the motion of the first-named means to be transmitted, a modulator cooperating with said transmitter for modulating the same, means for energizing said modulator when said first-named means is moved in a first direction and for de-energizing said modulator when the direction of motion of said means changes to a second direction, a receiving station located remote from the transmitting station and including two receiving channels, one of said receiving channels including an oscillating detecting means having a frequency near to the frequency of said transmitter, means responsive to the output of said oscillating detecting means for changing the frequency of said oscillating detecting means when there are beats in said oscillating detecting means between said received signal and the oscillating detecting means, said second channel including a non-oscillating detector which includes means for detecting the presence or absence of modulation in said received signal, means responsive to the output of the last-named detector for determining the direction of motion of said change in frequency of said oscillating detecting means, and means coupled to said oscillating detecting means for effecting changes in position depending on changes in the frequency of said oscillating detecting means.

5. In a system for reproducing motion, the combination with a first device whose motion is to be reproduced located at a first place of a tuned circuit coupled to said first device including means whereby its resonant frequency is changed in accordance with changes in the motion of said device, a radio transmitter and means controlling the frequency of said transmitter in accordance with the resonant frequency of said circuit, means for modulating said transmitter when said device is moved in a first direction, the last-named means including means whereby such modulation is not effected when said device is moved in a second direction, a pair of receiving devices at the second place, one of said receiving devices including an oscillating detector having a resonant circuit controlling the frequency thereof, said resonant circuit having a natural frequency approximately the same as that of the transmitter, means for amplifying and then rectifying the output of said oscillating detector, a motor, means responsive to the rectified output of the last-named means for energizing and de-energizing said motor, means coupling said motor to said last-named resonant circuit to change the frequency thereof when the motor rotates, the other channel including a non-oscillating detector for detecting the presence or absence of modulation which occurs when said first device is moved in said first direction, means responsive to the output of said non-oscillating detector for controlling the direction of rotation of said motor, and a device to be controlled coupled to said motor and driven thereby.

6. The device defined by claim 5 including a brake associated with said motor, electrically operated means for controlling said brake, and means whereby when the output of said rectifier falls to substantially zero said braking means is energized to effect the braking action on the rotation of said motor.

7. A remote control system comprising a first oscillator, an adjustable element operably associated with said oscillator to control its oscillation frequency in accordance with the setting of said adjustable element, an audio oscillator operable in response to the moving of said adjustable element in a given direction to modulate the oscillations from the first oscillator, a receiving station remote from the first oscillator and including two channels for receiving the oscillations from the first oscillator, a movable controlled element operably associated with said receiving station, the first channel including means responsive to frequency changes in the oscillations transmitted by said first oscillator for initiating movement of said controlled element in a given direction, and the second channel including means responsive to the reception of modulated oscillations to effect movement of said controlled element in a direction opposite to the aforementioned given direction.

8. A remote control system comprising a first oscillator, an adjustable element operably associated with said oscillator to control its oscillation frequency in accordance with the setting of said adjustable element, an audio oscillator operable in response to the moving of said adjustable element in a given direction to modulate the oscillations from said first oscillator, a receiving station remote from the first oscillator and including two channels for receiving the oscillations from the first oscillator, an oscillating detector in the first channel, a movable controlled element operably associated with said oscillating detector for controlling the frequency thereof, said first channel also including a high pass filter for eliminating frequency components equal or below that of the aforementioned audio oscillator and means responsive to the output of said oscillating detector for moving said controlled element to thereby change the frequency of said oscillating detector, said second channel including a non-oscillating detector and means connected to the output thereof and responsive to the reception of modulated oscillations to control the direction of movement of said controlled element.

9. A remote control system comprising a first oscillator, a first adjustable element operably associated with said oscillator to control its oscillation frequency in accordance with the setting of said adjustable element, an audio oscillator operable in response to the moving of said adjustable element in a given direction to modulate the oscillations from said first oscillator; a receiving station remote from the first oscillator and including two channels for receiving the oscillations from the first oscillator; the first channel including an oscillating detector, a high pass filter connected in the output thereof for eliminating frequency components equal or below the frequency of the aforementioned audio oscillator, a rectifier connected in the output of said filter, and a first relay connected in the output of said rectifier; the second channel including a non-oscillating detector, a second rectifier connected in the output thereof, and a second relay connected in the output of said second rectifier; a reversible direct current motor and a second adjustable element coupled thereto, whereby the position of the second adjustable element is controlled by rotation of said motor, and a power source for said motor, said relays being operably associated with said motor such that energization of said first relay connects said power source to said motor and thereby effects rotation of said motor in a given direction, and energization of said second relay when said first relay is also energized effects rotation of said motor in the opposite direction, said second adjustable element being operably connected with the oscillating detector to vary the frequency thereof in accordance with the position of said second adjustable element.

JACOB ANTHES.

REFERENCES CITED

The following references are of record in the file of this patent:

UNITED STATES PATENTS

| Number | Name | Date |
|---|---|---|
| 2,033,237 | Gannett | Mar. 10, 1937 |
| 2,280,019 | Alexanderson et al. | Apr. 14, 1942 |
| 2,304,702 | Myers | Dec. 8, 1942 |
| 2,321,971 | Becker | June 15, 1943 |
| 2,398,419 | Finison | Apr. 16, 1946 |
| 2,428,297 | Seeley | Sept. 30, 1947 |
| 2,429,771 | Roberts | Oct. 28, 1947 |